United States Patent
Pathak et al.

(10) Patent No.: US 11,776,085 B2
(45) Date of Patent: Oct. 3, 2023

(54) THROTTLING SHADERS BASED ON RESOURCE USAGE IN A GRAPHICS PIPELINE

(71) Applicant: ADVANCED MICRO DEVICES, INC., Santa Clara, CA (US)

(72) Inventors: Nishank Pathak, Orlando, FL (US); Randy Wayne Ramsey, Orlando, FL (US); Tad Litwiller, Orlando, FL (US); Rex Eldon McCrary, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/123,978

(22) Filed: Dec. 16, 2020

(65) Prior Publication Data

US 2022/0188963 A1 Jun. 16, 2022

(51) Int. Cl.
*G06T 1/20* (2006.01)
*G06F 1/08* (2006.01)
*G06T 17/10* (2006.01)
*G06T 15/00* (2011.01)

(52) U.S. Cl.
CPC .......... *G06T 1/20* (2013.01); *G06F 1/08* (2013.01); *G06T 15/005* (2013.01); *G06T 17/10* (2013.01)

(58) Field of Classification Search
CPC ......... G06T 1/20; G06T 17/10; G06T 15/005; G06F 1/08
See application file for complete search history.

(56) References Cited

U.S. PATENT DOCUMENTS

| | | | |
|---|---|---|---|
| 7,594,095 | B1 | 9/2009 | Nordquist |
| 9,594,560 | B2 * | 3/2017 | Ananthakrishnan ........................ G06F 1/3206 |
| 9,965,321 | B2 | 5/2018 | Duluk et al. |

(Continued)

FOREIGN PATENT DOCUMENTS

| | | |
|---|---|---|
| KR | 10-2012-0064093 A | 6/2012 |
| KR | 10-2014-0039076 A | 3/2014 |
| KR | 10-2017-0021312 A | 2/2017 |

OTHER PUBLICATIONS

Hsiao et al., Demand look-ahead memory access scheduling for 3D graphics processing units, Aug. 6, 2013, Springer Science Business Media New York 2013. (Year: 2013).*

(Continued)

*Primary Examiner* — Said Broome
*Assistant Examiner* — Donna J. Ricks

(57) ABSTRACT

A processing system includes a graphics pipeline that executes a first shader of a first type and a second shader of a second type. In some cases, the first shader is a geometry shader and the second shader is a pixel shader. The processing system also includes buffers that hold primitives generated by the first shader and provide the primitives to the second shader. The processing system also includes a primitive hub that monitors fullness of the buffers. Launching of waves from the first shader is throttled based on the fullness of the buffers. A shader processor input (SPI) selectively throttles the waves launched by the geometry shader based on a signal from the primitive hub indicating the fullness, an indication of relative resource usage of geometry waves and pixel waves in the graphics pipeline, or an indication of lifetimes of the geometry waves.

20 Claims, 11 Drawing Sheets

(56) References Cited

U.S. PATENT DOCUMENTS

| | | |
|---|---|---|
| 2006/0139365 A1 | 6/2006 | Naoi |
| 2006/0161762 A1 | 7/2006 | Eisen et al. |
| 2007/0139421 A1* | 6/2007 | Chen .................. G06T 1/20 345/501 |
| 2009/0033672 A1 | 2/2009 | Jiao et al. |
| 2009/0150657 A1 | 6/2009 | Gschwind et al. |
| 2009/0295804 A1* | 12/2009 | Goel .................. G06T 15/005 345/426 |
| 2011/0037769 A1 | 2/2011 | Chen |
| 2012/0096474 A1 | 4/2012 | Jiao |
| 2013/0021360 A1* | 1/2013 | Gruber ................ G06F 9/52 345/589 |
| 2013/0169634 A1 | 7/2013 | Goel et al. |
| 2013/0169636 A1 | 7/2013 | Yang et al. |
| 2014/0092092 A1 | 4/2014 | Li et al. |
| 2014/0098117 A1 | 4/2014 | Goel et al. |
| 2014/0285500 A1 | 9/2014 | Lindholm et al. |
| 2015/0221063 A1 | 8/2015 | Kim et al. |
| 2015/0348226 A1 | 12/2015 | Vaishampayan et al. |
| 2016/0148424 A1 | 5/2016 | Chung et al. |
| 2017/0031708 A1 | 2/2017 | Chen et al. |
| 2017/0249149 A1 | 8/2017 | Priyadarshi et al. |
| 2017/0372506 A1 | 12/2017 | Surti |
| 2018/0211435 A1 | 7/2018 | Nijasure et al. |
| 2019/0042410 A1 | 2/2019 | Gould et al. |
| 2019/0129756 A1 | 5/2019 | Kazakov et al. |
| 2019/0236749 A1 | 8/2019 | Gould et al. |
| 2019/0259193 A1 | 8/2019 | Harris et al. |
| 2019/0266069 A1 | 8/2019 | Schluessler et al. |
| 2019/0317807 A1 | 10/2019 | Basu et al. |
| 2020/0004460 A1* | 1/2020 | Gould .................. G06F 3/0659 |
| 2020/0098082 A1 | 3/2020 | Gutierrez et al. |
| 2021/0049729 A1 | 2/2021 | Paltashev et al. |

OTHER PUBLICATIONS

U.S. Appl. No. 17/121,965, filed Dec. 15, 2020 in the name of Nishank Pathak et al.

U.S. Appl. No. 17/217,050, filed Mar. 30, 2021 in the name of Chriistopher J. Brennan et al.

International Search Report and Written Opinion dated Mar. 3, 2022 for PCT/US2021/061387, 8 pages.

Notice of Allowance issued in U.S. Appl. No. 17/121,965 dated Jul. 19. 2022, 5 pages.

Non-Final Office Action dated Mar. 18, 2022 for U.S. Appl. No. 17/121,965, 12 pages.

Hao Wang et al., "Memory scheduling towards high-throughput cooperative heterogeneous computing," 23rd International Conference on Parallel Architecture and Compilation Techniques (PACT), IEEE, 2014, 11 pages.

International Search Report and Written Opinion dated Apr. 1, 2022 for PCT/US2021/063251, 10 pages.

International Search Report and Written Opinion dated Jun. 2, 2022 for PCT/US2022/017156, 10 pages.

Non-Final Office Action issued in U.S. Appl. No. 17/217,050, dated Sep. 6, 2022 36 pages.

Notice of Allowance issued in U.S. Appl. No. 17/217,050, dated Mar. 9, 2023 21 pages.

* cited by examiner

THROTTLING SHADERS BASED ON RESOURCE USAGE IN A GRAPHICS PIPELINE

BACKGROUND

Graphics processing units (GPUs) implement graphics processing pipelines that concurrently process copies of commands that are retrieved from a command buffer. The graphics pipeline includes one or more shaders that execute using resources of the graphics pipeline and one or more fixed function hardware blocks. The graphics pipeline is typically divided into a geometry portion that performs geometry operations on patches or other primitives such as triangles that are formed of vertices and edges and represent portions of an image. The shaders in the geometry portion can include vertex shaders, hull shaders, domain shaders, and geometry shaders. The geometry portion of the graphics pipeline completes when the primitives produced by the geometry portion of the pipeline are rasterized (e.g., by one or more scan converters) to form sets of pixels that represent portions of the image. Subsequent processing on the pixels is referred to as pixel processing and includes operations performed by shaders such as a pixel shader executing using resources of the graphics pipeline. GPUs and other multi-threaded processing units typically implement multiple processing elements (which are also referred to as processor cores or compute units) that concurrently execute multiple instances of a single program on multiple data sets as a single wave. A hierarchical execution model is used to match the hierarchy implemented in hardware. The execution model defines a kernel of instructions that are executed by all the waves (also referred to as wavefronts, threads, streams, or work items).

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
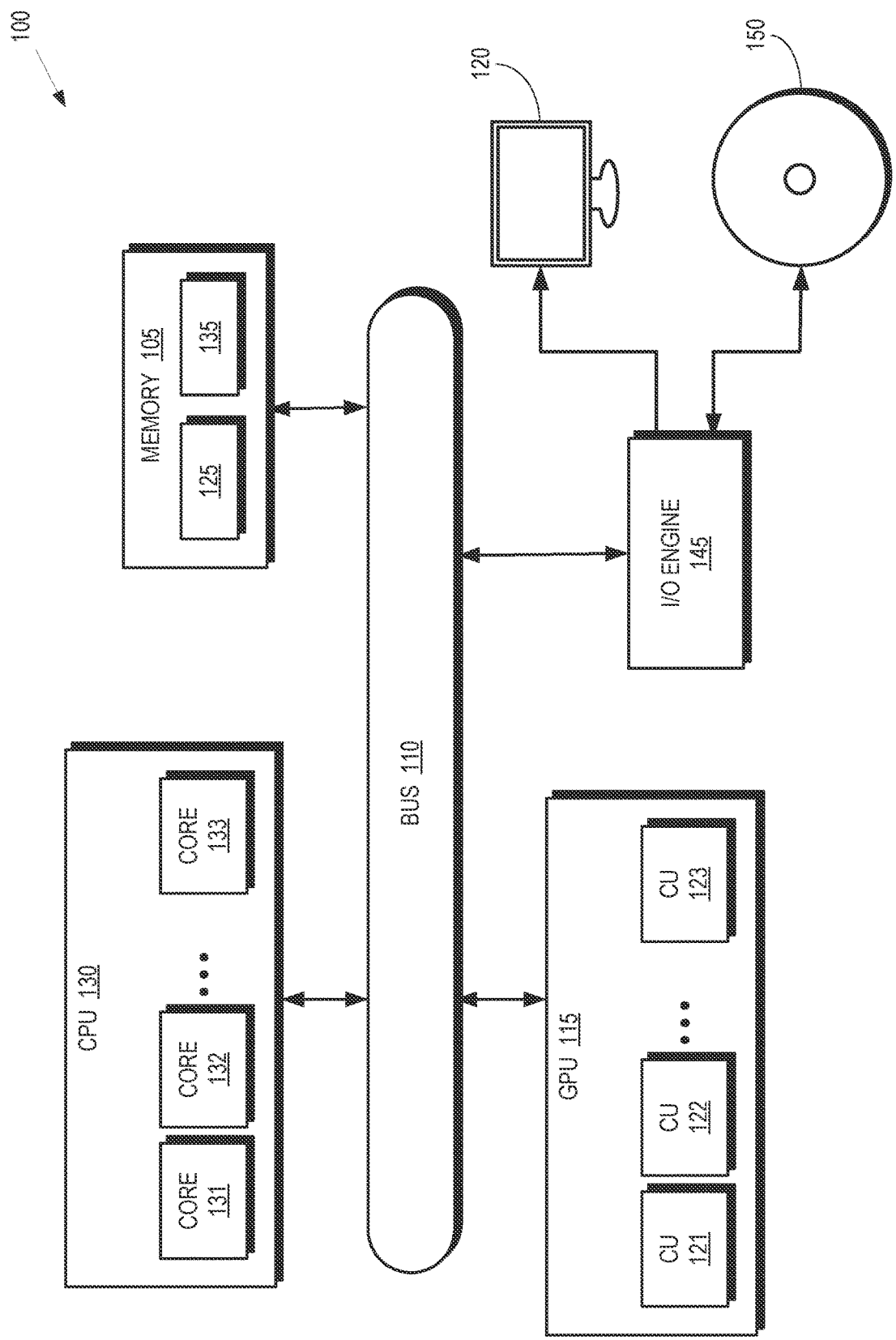
FIG. 1 is a block diagram of a processing system according to some embodiments.

Shaders, such as a geometry shader in the geometry portion of the graphics pipeline of a GPU, launch waves that are processed by the shader. The results of the shader processing are passed to downstream entities such as other shaders in the pipeline. For example, a geometry shader wave generator launches waves using a greedy algorithm that attempts to use as many of the resources of the graphics pipeline as possible. The primitives processed by the geometry shader are passed to one or more scan converters that convert the primitives into pixels for processing in the pixel shader. Launching waves based on a greedy algorithm for processing in one shader can deprive downstream shaders of the resources needed to complete their operations on primitives or pixels. For example, the pixel shader may not be able to access resources of the graphics pipeline to perform shading on pixels received from the scan converter if the geometry shader wave generator launches too many waves and the geometry shader monopolizes the resources of the graphics pipeline. Some graphics pipelines are configured to limit the number of waves in-flight by constraining the number of compute units that can be allocated to the shaders for processing waves. However, a static limit on the number of available compute units typically reduces performance of the graphics pipeline when executing draw calls that require larger numbers of compute units.

FIGS. 1-11 disclose embodiments of a graphics pipeline that maintains a balance between resources consumed by a first shader of a first type and a second shader of a second type by selectively launching waves from the first shader based on measures of the graphics pipeline resources consumed by the first shader and the second shader. In some embodiments, the first shader is a geometry shader and the second shader is a pixel shader. The geometry shader selectively launches geometry waves based on fullness of buffers that provide primitives to scan converters and measures of the relative allocations of resources to the geometry shaders and the pixel shader. A primitive hub monitors fullness of a set of first-in-first-out (FIFO) buffers that receive primitives from the geometry shader and provide the primitives to a set of scan converters that generate pixels based on the received primitives. The primitive hub throttles the waves launched by the geometry shader using a stall signal implemented as a stall counter that is incremented to indicate a number of "dead" cycles. The number of dead cycles is determined based on at least one fullness of the FIFO buffers and then decremented at each clock cycle. The geometry shader launches waves in response to the stall counter having a predetermined value such as zero.

The primitive hub provides feedback that indicates the fullness to a shader processor input (SPI), which selectively throttles the geometry shader waves based on resource usage of the geometry shader and the pixel shader. Some embodiments of the SPI determine the relative allocation of local data store (LDS) resources to in-flight geometry shader waves and in-flight pixel shader waves, the relative allocation of registers such as vector general-purpose registers (VGPRs) to the in-flight geometry shader waves and in-flight pixel shader waves, or a combination thereof. The SPI increments the stall counter in response to the relative allocation of resources to the in-flight geometry shader waves and in-flight pixel shader waves exceeding a threshold that indicates that the in-flight geometry shader waves are consuming resources that prevent the in-flight pixel shader waves from being processed. In some embodiments, the value of the stall counter is also determined based on lifetimes of geometry shader waves in one or more geometry shader groups so that the stall counter is incremented if the lifetimes exceed a threshold.

FIG. 1 is a block diagram of a processing system 100 according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, shader arrays, shader engines, and the like. The number of compute units 121-123 implemented in the GPU 115 is a matter of design choice and some embodiments of the GPU 115 include more or fewer compute units than shown in FIG. 1. The compute units 121-123 can be used to implement a graphics pipeline, as discussed herein. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The processing system 100 implements pipeline circuitry for executing instructions in multiple stages of the pipeline. The pipeline circuitry is implemented in some embodiments of the compute units 121-123 or the processor cores 131-133. In some embodiments, the pipeline circuitry is used to implement a graphics pipeline that executes shaders of different types including, but not limited to, the vertex shaders, hull shaders, domain shaders, geometry shaders, and pixel shaders. The pipeline circuitry also includes buffers that hold primitives generated by the shaders. In some embodiments, one or more buffers hold primitives generated by the geometry shader and then provide these primitives to a pixel shader. The pipeline circuitry also includes a primitive hub that monitors fullness of the buffers. Launching of waves from the geometry shader is throttled based on the fullness of the buffers. A shader processor input (SPI) selectively throttles the waves launched by the geometry shader based on a signal from the primitive hub indicating the fullness, an indication of relative resource usage of geometry waves and pixel waves in the graphics pipeline, or an indication of lifetimes of the geometry waves.

Figure 2:
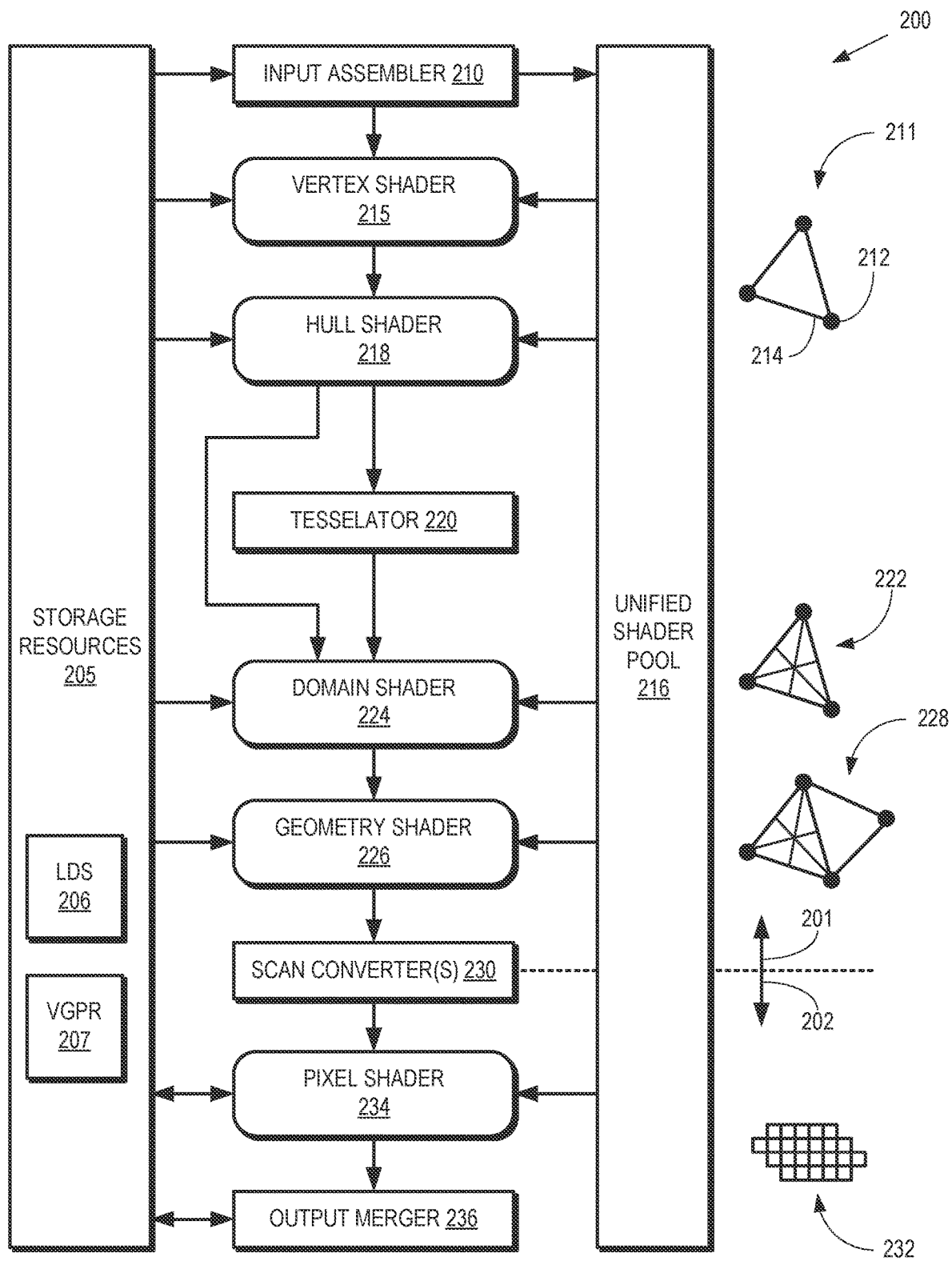
FIG. 2 depicts a graphics pipeline configured to provide processing of high-order geometry primitives to generate rasterized images of three-dimensional (3D) scenes at a predetermined resolution according to some embodiments.

FIG. 2 depicts a graphics pipeline 200 configured to process high-order geometry primitives to generate rasterized images of three-dimensional (3D) scenes at a predetermined resolution according to some embodiments. The graphics pipeline 200 is implemented in some embodiments of the processing system 100 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to implement buffers and store vertex data, texture data, and the like. In the illustrated embodiment, the storage resources 205 include local data store (LDS) 206 circuitry that is used to store data and vector general-purpose registers (VGPRs) to store register values used during rendering by the graphics pipeline 200. The storage resources 205 are implemented using some embodiments of the system memory 105 shown in FIG. 1.

An input assembler 210 accesses information from the storage resources 205 that is used to define objects that represent portions of a model of a scene. An example of a primitive is shown in FIG. 2 as a triangle 211, although other types of primitives are processed in some embodiments of the graphics pipeline 200. The triangle 203 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shaders such as the vertex shader 215 implement massive single-instruction-multiple-data (SIMD) processing so that multiple vertices are processed concurrently. The graphics pipeline 200 implements a unified shader model so that all the shaders included in the graphics pipeline 200 have the same execution platform on the shared massive SIMD compute units. The shaders, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data. In some embodiments, primitives generated by the hull shader 218 are provided to a tessellator 220. The tessellator 220 receives objects (such as patches) from the hull shader 218 and generates information identifying primitives corresponding to the input object, e.g., by tessellating the input objects based on tessellation factors provided to the tessellator 220 by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated embodiment, the domain shader 224 generates primitives 222 based on the triangles 211 and the tesselation factors. A geometry shader 226 receives an input primitive and outputs up to four primitives that are generated by the geometry shader 226 based on the input primitive. In the illustrated embodiment, the geometry shader 226 generates the output primitives 228 based on the tessellated primitive 222.

One stream of primitives is provided to one or more scan converters 230 and, in some embodiments, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user.

Figure 3:
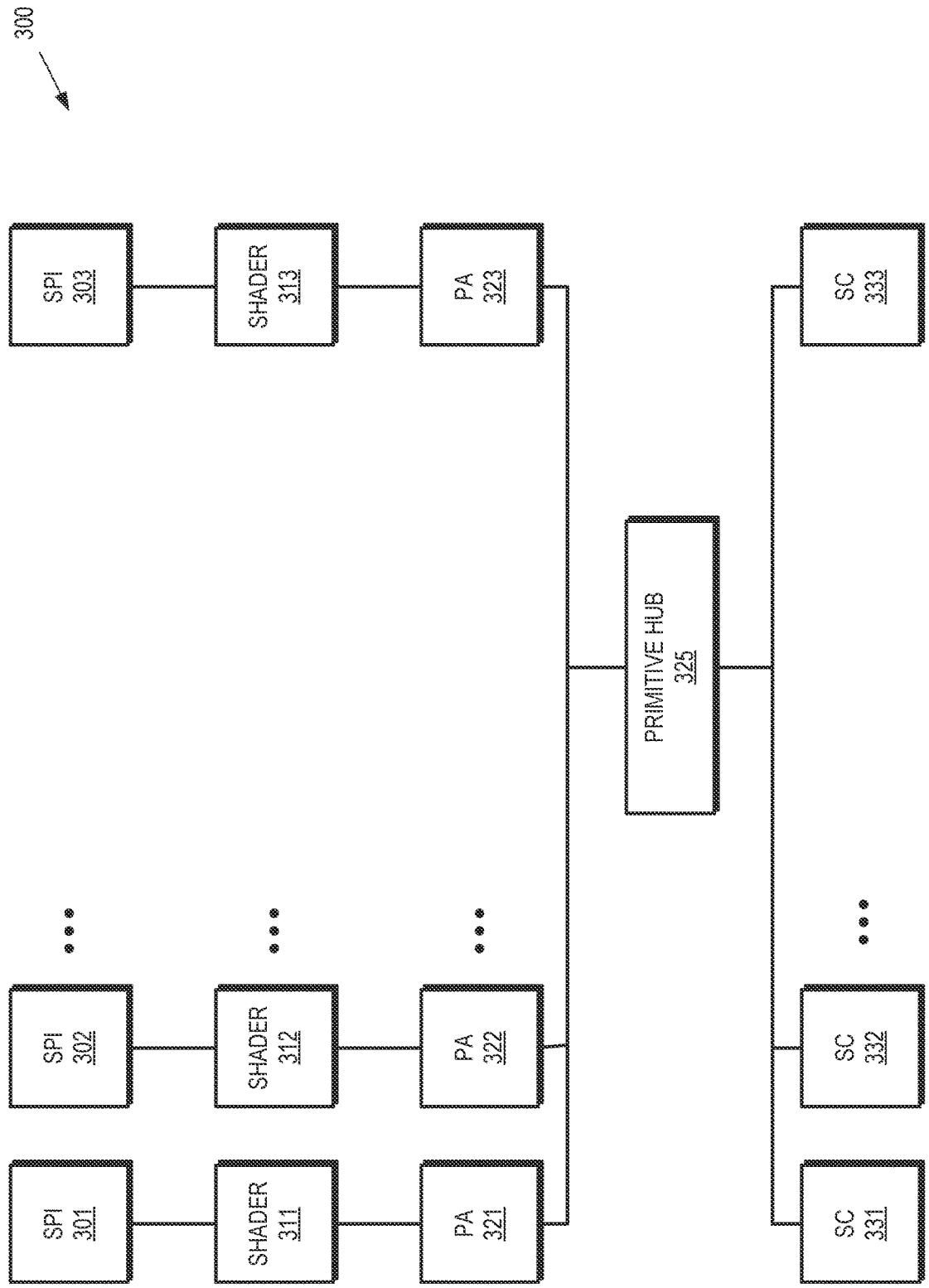
FIG. 3 is a block diagram of a portion of a graphics pipeline that implements shader throttling based on resource usage of different types of shaders according to some embodiments.

FIG. 3 is a block diagram of a portion 300 of a graphics pipeline that implements shader throttling based on resource usage of different types of shaders according to some embodiments. The portion 300 is used to implement some embodiments of the graphics pipeline 200 shown in FIG. 2. Commands are distributed to shader processor input (SPI) circuitry 301, 302, 303 (collectively referred to herein as "the SPI 301-303") that launch waves for processing by corresponding shaders 311, 312, 313 (collectively referred to herein as "the shaders 311-313"). In the illustrated embodiment, the shaders 311-313 are implemented as geometry shaders. Although not shown in FIG. 3 in the interest of clarity, the SPI 301-303 include (or are associated with) counters that are used to throttle wave launches for the shaders 311-313, as discussed herein. The shaders 311-313 generate output including points, lines, triangles, or other primitives that is provided to corresponding primitive assemblers (PA) 321, 322, 323, which are collectively referred to herein as "the PA 321-323."

A primitive hub 325 receives primitives from the PA 321-323 and distributes the primitives to scan converters 331, 332, 333, which are collectively referred to herein as "the scan converters 331-333." Some embodiments of the primitive hub 325 include a buffer complex (not shown in FIG. 3 in the interest of clarity) made up of sets of first-in-first-out (FIFO) buffers associated with each of the PA 320 123. Each set of buffers is associated with a corresponding one of the scan converters 331-333 so that the primitive hub 323 can selectively provide primitives from any of the PA 321-323 to any of the scan converters 331-333 via a corresponding FIFO buffer. The primitive hub 323 also provides signals indicative of fullness of the FIFO buffers to the SPI 301-303, which use the signals to selectively throttle wave launches, as discussed herein. The scan converters 331-333 rasterize the received primitives to generate sets of pixels representative of the primitives for display.

Some embodiments of the SPI 301-303 collect data that indicates resource usage by shaders including a geometry shader (such as the geometry shader 226 shown in FIG. 2) and a pixel shader (such as the pixel shader 234 shown in FIG. 2). The resource usage data is then used to selectively throttle wave launches. In some embodiments, the SPI 301-303 implement resource usage counters (not shown in FIG. 3 in the interest of clarity), which are used to reduce the geometry shader wave launch rate in response to determining that the resource usage by the geometry shader is negatively impacting the pixel shader waves. The data acquired by the SPI 301-303 includes:

1. Amount of resource used by geometry shader and pixel shader waves in flight by considering LDS and VGPR consumption. The throttling circuitry considers:
   a. Number of VGPRs used by geometry shader waves that are in flight.
   b. Number of VGPRs used by pixel shader waves that are in flight.
   c. Number of LDS chunks used by geometry shader waves that are in flight.
   d. Number of LDS chunks used by pixel shader waves that are in flight.

The data collection logic has two usage modes that are controlled by a parameter value accessible and modifiable by the SPI:
   Mode 0—the logic looks at the ratio of resources used by geometry shader waves to the total number of VGPRs available to the shader engine. This information can be used to limit the resource usage by the geometry shader in the shader engine
   Mode 1—the logic looks at the ratio of the resources used by geometry shader and the sum of the geometry shader and pixel shader resources. This information is used to limit the relative resource usage of the geometry shader and the pixel shader.

2. Number of cycles a pixel shader wave is stalled because resources are not available in a workgroup processor. A style count for the pixel shader is determined as follows:

The throttle logic gets a stall signal from resource allocator logic.
A stall counter counts the number of cycles for which the stall signal is high and generates a stall count, which is flopped on the next sample.
The flopped stall count is multiplied by a factor of two if the pixel shader is wave64. A maximum value of the stall count is equal to the programmed sample interval for wave32 pixel shaders and two times that value for wave64 pixel shaders.
The stall counter resets to 0 on sample.

The portion 300 of the graphics pipeline can hide to some latency in groups of waves launched from the geometry shader. However, if the actual lifetime of the waves (or the corresponding groups) exceeds this value, the performance of the graphics pipeline declines and the geometry shader wave groups begin blocking resources for longer durations. Thus, if pixel shader waves are starved for resources, a geometry shader group with a longer lifetime potentially creates a longer stall for pixels than a geometry shader group with a shorter lifetime. Some embodiments of the SPI 301-303 therefore monitor the lifetimes of geometry shader groups and compare the lifetimes to a threshold. The SPI 301-303 generate longer stalls to throttle wave launches from the geometry shader in response to the lifetimes of the geometry shader groups exceeding the threshold.

Figure 4:
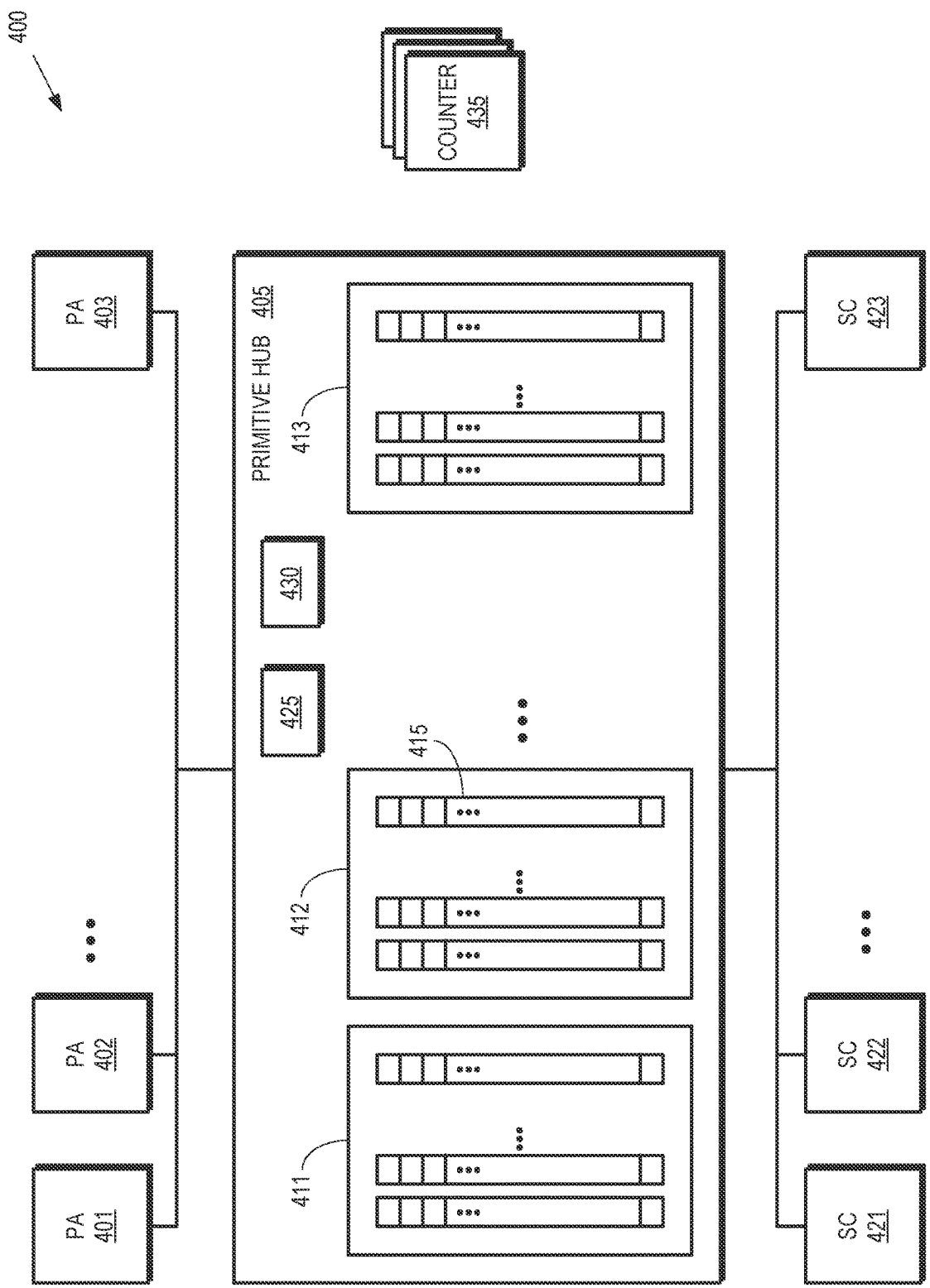
FIG. 4 is a block diagram of a portion of a graphics pipeline that selectively launches geometry waves based on resource usage in the graphics pipeline according to some embodiments.

FIG. 4 is a block diagram of a portion 400 of a graphics pipeline that selectively launches geometry waves based on resource usage in the graphics pipeline according to some embodiments. The portion 400 of the graphics pipeline is used to implement some embodiments of the graphics pipeline 200 shown in FIG. 1 and the portion 300 of the graphics pipeline shown in FIG. 3. The portion 400 includes primitive assemblers (PA) 401, 402, 403, which are collectively referred to herein as "the PA 401-403" and receive primitives from corresponding shaders such as the shaders 311-313 shown in FIG. 3.

A primitive hub 405 includes sets 411, 412, 413 of buffers 415 (only one indicated by a reference numeral in the interest of clarity) and each of the sets 411-413 is associated with a corresponding scan converter 421, 422, 423, which are collectively referred to herein as "the scan converters 421-423." The primitive hub 405 receives the primitives from the PA 401-403 and stores copies of the primitives in corresponding buffers in each of the sets 411-413. The primitive hub 405 also monitors fullness of the buffers 415 and determines whether to throttle wave launch based on the fullness. In some embodiments, polling logic 425 in the primitive hub 405 polls the buffers 415 in the set 411-413 to determine their fullness at programmed time intervals such as every thousand clock cycles. A rate limiter 430 in the primitive hub 405 increments a number of dead cycles that is used to throttle wave launch for the geometry shader. In some embodiments, the rate limiter 430 uses a first value to indicate the number of dead cycles to be added on each increment and a second value that indicates the incremental steps. Thus, on every increment, the number of dead cycles is incremented by the second value and on every decrement pulse, the dead cycles are reduced by the second value.

The portion 400 of the graphics pipeline includes counters 435 that indicate how many dead cycles are used to selectively throttle wave launch. Some embodiments of the counters 435 are implemented in the corresponding SPI such as the SPI 301-303 shown in FIG. 3. The primitive hub 405 provides a signal (e.g., backpressure) to the SPI that indicates the monitored buffer fullness. In some embodiments, the backpressure is provided on an interface between the primitive hub 405 and the PA 401-403. The backpressure indicates an estimate of the amount of geometry work that is waiting to be consumed post culling. For example, the backpressure is conveyed as a 2-bit status signal that is conveyed from the primitive hub 405 to each SPI. The two bits represent the status of the buffers 415. In some embodiments, status logic looks at all the buffers 415 in the sets 411-413 corresponding to each PA 401 and generates the status based on the buffer 415 that has most entries and is therefore the most "full." As discussed herein, the SPI can operate in different modes. Table 1 indicates the status represented by the status bits in some embodiments. The status logic is replicated per PA 401-403.

TABLE 1

| Status | Interpretation |
|---|---|
| 00 | FIFO is less than or equal to quarter full |
| 01 | FIFO is less than or equal to half full but more than quarter full |
| 10 | FIFO is less than or equal to 3 quarters full but more than half full |
| 11 | if SPI is in first mode: FIFO is more than 3 quarters full else if SPI is in second mode: FIFO is full |

Figure 5:
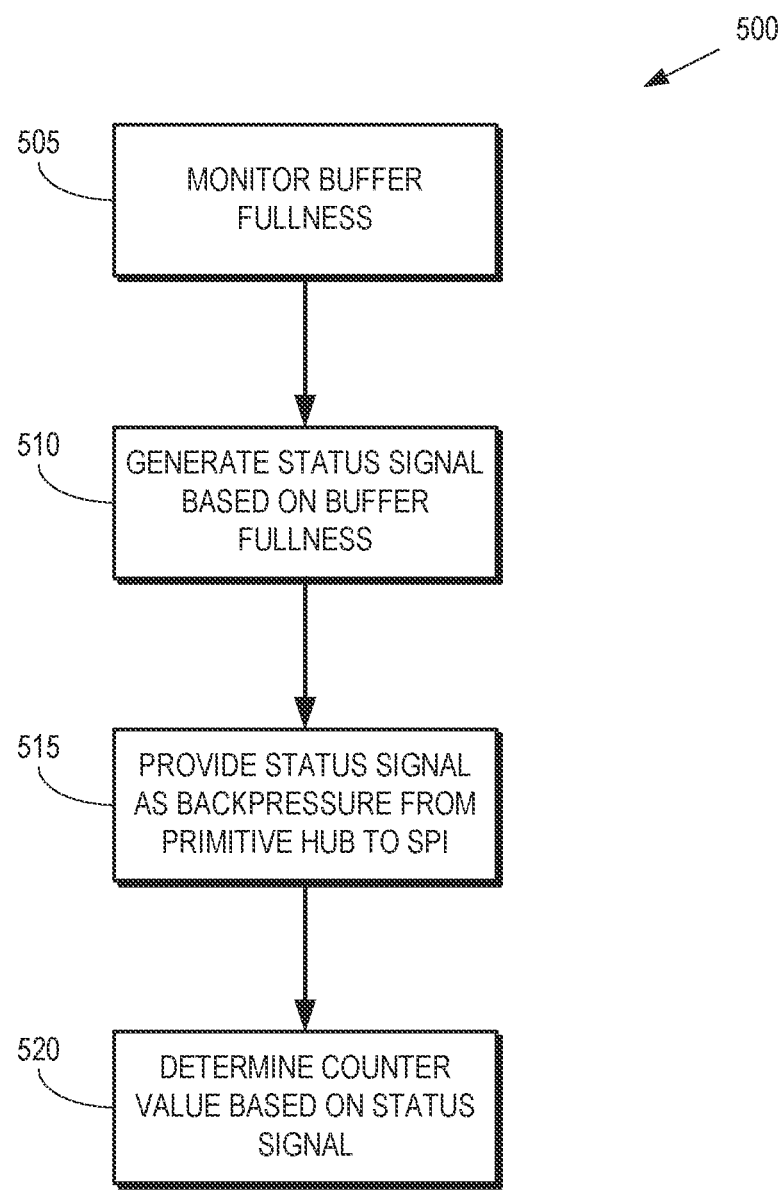
FIG. 5 is a flow diagram of a method of determining a counter value for selectively throttling geometry waves based on buffer fullness according to some embodiments.

FIG. 5 is a flow diagram of a method 500 of determining a counter value for selectively throttling geometry waves based on buffer fullness according to some embodiments. The method 500 is implemented in some embodiments of the processing system 100 shown in FIG. 1, the graphics pipeline 200 shown in FIG. 2, the portion 300 of the processing system shown in FIG. 3, and the portion 400 of the processing system shown in FIG. 4.

At block 505, a primitive hub monitors buffer fullness for a set of FIFO buffers that receive data from one or more primitive assemblers and provide the data to one or more scan converters for rasterization. At block 510, the primitive hub generates a status signal based on the buffer fullness. As discussed herein, the status signal can include a set of bits (e.g., two bits) that have values indicating different ranges of buffer fullness.

At block 515, the primitive hub provides the status signal to one or more SPIs. At block 520, a counter value is determined based on the status signal. For example, the counter value can be given a value that is determined based on the range of buffer fullness indicated by the status signal so that the counter value is incremented by a larger amount if the buffer fullness is larger. As discussed herein, selective throttling of geometry waves is performed using the counter value determined based on the buffer fullness in conjunction with counter values determined based on relative resource usage of geometry shader waves and pixel shader waves and counter values that are determined based on lifetimes of the geometry shader waves or groups thereof.

Figure 6:
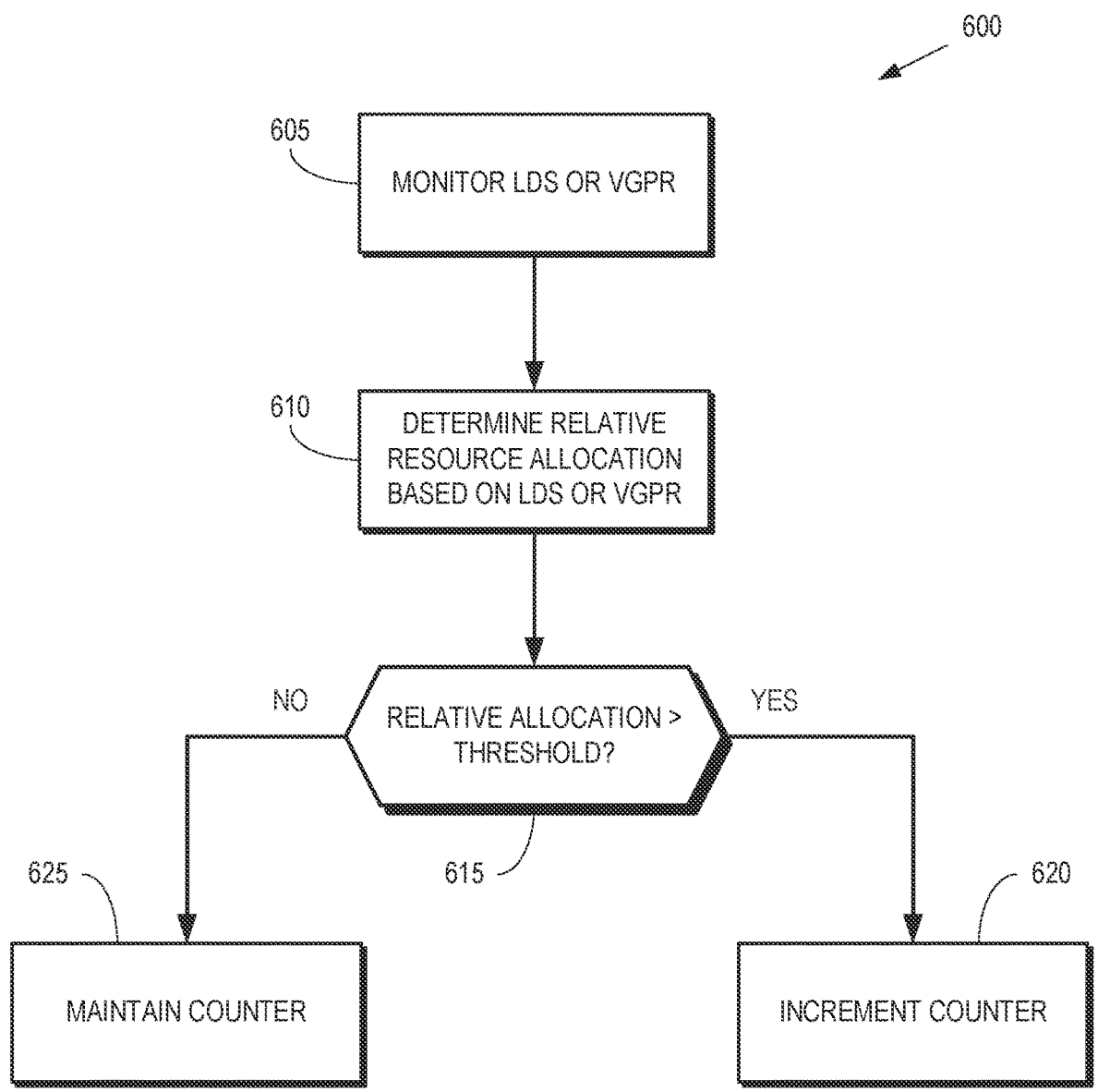
FIG. 6 is a flow diagram of a method of determining a counter value for selectively throttling geometry waves based on relative resource usage of geometry shader waves and pixel shader waves according to some embodiments.

FIG. 6 is a flow diagram of a method 600 of determining a counter value for selectively throttling geometry waves based on relative resource usage of geometry shader waves and pixel shader waves according to some embodiments. The method 600 is implemented in some embodiments of the processing system 100 shown in FIG. 1, the graphics pipeline 200 shown in FIG. 2, the portion 300 of the processing system shown in FIG. 3, and the portion 400 of the processing system shown in FIG. 4.

At block 605, an SPI monitors resource usage by geometry shader waves and pixel shader waves. In the illustrated embodiment, the SPI monitors LDS usage, VGPR usage, or a combination thereof by the geometry shader waves and the pixel shader waves. At block 610, the SPI determines a relative resource allocation to the geometry and pixel shader waves based on the LDS usage, the VGPR usage, or a combination thereof, as discussed herein.

At decision block 615, the SPI determines whether the relative allocation is above a threshold. If so, the method 600 flows to the block 620 and the SPI increments the value that is used to set the counter for selectively throttling launch of geometry shader waves. If the relative allocation is not above the threshold, the method 600 flows to the block 625 and the SPI maintains the counter at its current value. As discussed herein, selective throttling of geometry waves is performed using the counter value determined based on the relative resource usage of the geometry shader waves and the pixel shader waves in conjunction with counter values determined based on buffer fullness at a primitive hub and counter values that are determined based on lifetimes of the geometry shader waves or groups thereof.

Figure 7:
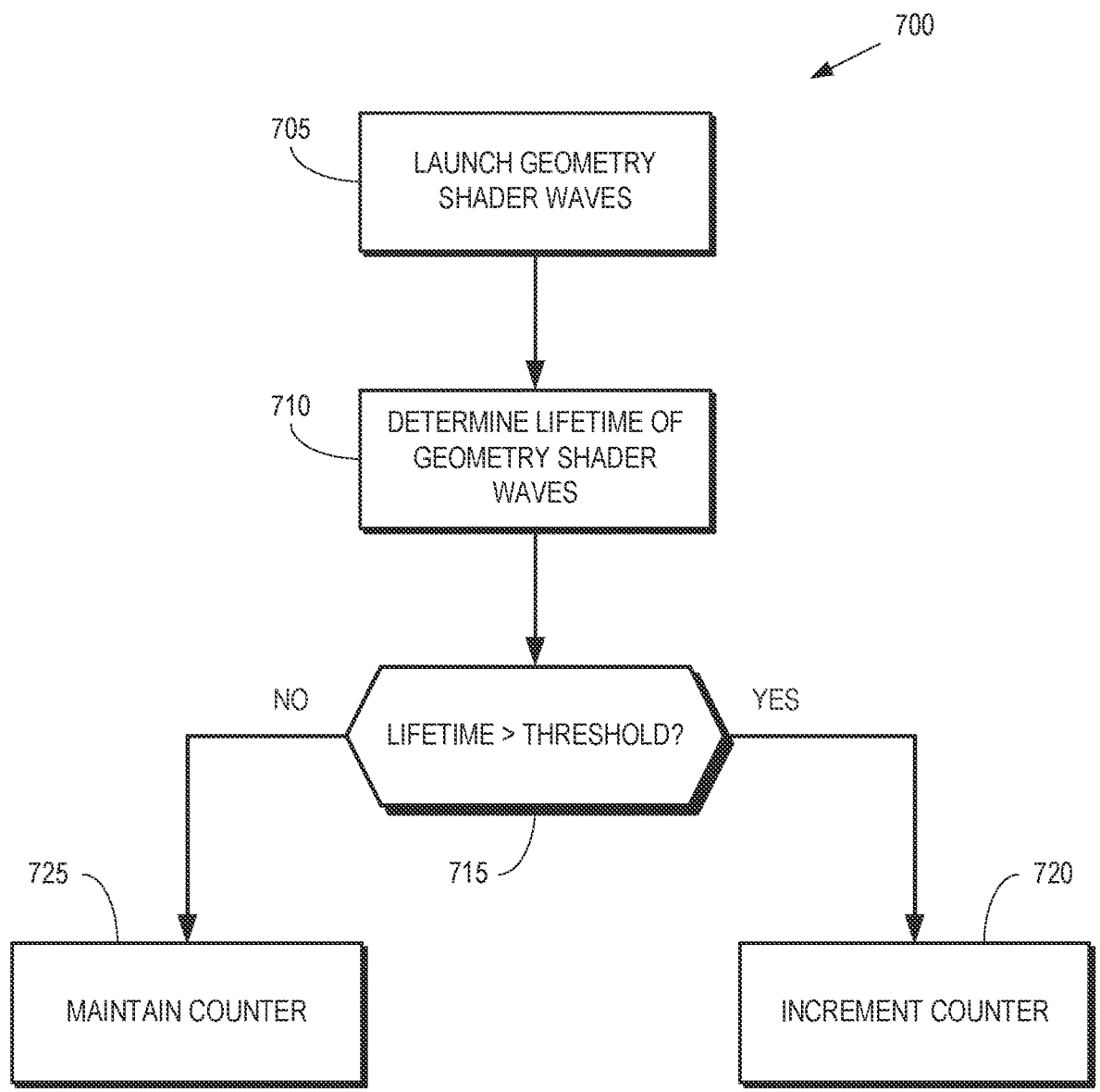
FIG. 7 is a flow diagram of a method of determining a counter value for selectively throttling geometry waves based on lifetimes of geometry shader waves or groups thereof according to some embodiments.

FIG. 7 is a flow diagram of a method 700 of determining a counter value for selectively throttling geometry waves based on lifetimes of geometry shader waves or groups thereof according to some embodiments. The method 700 is implemented in some embodiments of the processing system 100 shown in FIG. 1, the graphics pipeline 200 shown in FIG. 2, the portion 300 of the processing system shown in FIG. 3, and the portion 400 of the processing system shown in FIG. 4.

At block 705, a geometry shader wave (or a group of geometry shader waves) are launched in a graphics pipeline. At block 710, an SPI determines a lifetime of the geometry shader wave (or the group), as discussed herein. At decision block 715, the SPI determines whether the lifetime is above a threshold. If so, the method 700 flows to the block 720 and the SPI increments the value that is used to set the counter for selectively throttling launch of geometry shader waves. If the lifetime is not above the threshold, the method 600 flows to the block 725 and the SPI maintains the counter at its current value. As discussed herein, selective throttling of geometry waves is performed using the counter value determined based on the lifetime of the geometry shader wave (or group) in conjunction with counter values determined based on buffer fullness at a primitive hub and counter values that are determined based on relative resource usage of the geometry shader waves and the pixel shader waves.

In some embodiments, the geometry shader waves are throttled by adding a stall signal that has a predetermined value (e.g., a high value or 1) that is maintained until a stall count goes to another predetermined value such zero. While the stall signal remains high, resources are not granted are allocated to geometry shader waves. The stall count is determined based on the FIFO status data generated by the primitive hub, resource usage data generated by the SPI, and lifetimes of the geometry waves. For example, the stall count can be generated by applying an OR operation to select the largest stall count among the three options disclosed above. The minimum stall count is set to zero and a maximum stall count of 1024 are used in some embodiments.

Throttling by the primitive hub (or based on the backpressure generated by the primitive hub) is performed based on the value of register fields that control the number of dead cycles indicated by the stall counter. A first field indicates a number of dead cycles added on a transition from a "no throttle" condition to a throttling condition. The second field indicates an increment or decrement to the dead cycles on each sample. If throttling is enabled and the next geometry shader wave has been granted resources, the stall counter is loaded with the stall count and starts to down count. The number of dead cycles to be added is determined on sample but the count is used in response to the next geometry shader wave being granted resources.

Throttling by the SPI is determined based on the resource usage information, as discussed herein. In some embodiments, there are multiple triggers for throttling geometry shader wave launches.

The first trigger is based on the LDS usage by geometry shader waves. The geometry shader wave launch is throttled in response to the measured usage exceeding a threshold. Some embodiments of the trigger generation logic use the following modes:

Mode 0—This mode looks at the LDS usage of geometry shader groups compared to the total LDS available in the Shader Engine. If this ratio exceeds or is equal to the threshold, the first trigger is set. The valid register values are from 0 to 9. This value is multiplied by 10 before comparison.

Mode 1—This mode looks at the LDS usage of geometry shader waves compared to the total LDS used by geometry shader and pixel shader waves in the Shader Engine. If this ratio exceeds or is equal to the threshold, a second trigger is set. The valid register values are from 0 to 9. This value is multiplied by 10 before comparison.

Mode2—This mode does not look at the usage. The first trigger is always set in this mode. Launch of the geometry shader waves is throttled if PS waves are stalling regardless of the GS resource usage.

The second trigger is based on the VGPR usage by geometry shader waves. The geometry shader wave launch is throttled in response to the measured usage exceeding a threshold. Some embodiments of the trigger generation logic use the following modes:

Mode 0—This mode looks at the number of VGPRs used by geometry shader waves and compares it to the total number of VGPRs available in the Shader Engine. If this ratio exceeds or is equal to a threshold, the second trigger is set. The valid register values are from 0 to 9. This value is multiplied by 10 before comparison.

Mode 1—This mode looks at the number of VGPRs used by geometry shader waves and compares that to the total number of VGPRs used by geometry shader and pixel shader waves in the Shader Engine. If this ratio exceeds or is equal to the threshold, the second trigger is set. The valid register values are from 0 to 9. This value is multiplied by 10 before comparison.

Mode2—This mode does not look at the usage. The second trigger is always set in this mode. Launch of the geometry shader waves is throttled if pixel shader waves are stalling regardless of the geometry shader resource usage.

The third trigger is set based on an average number of cycles during which a pixel shader wave is stalled. The number of cycles of pixel shader wave stall is sampled at predetermined time intervals, e.g., after predetermined numbers of clock cycles. The third trigger is set if the following conditions are met:

1. Current number of pixel shader stall cycles is greater than or equal to the calculated average stall cycles OR is equal to the max sample count.
2. Current number of pixel shader stall cycles is greater than or equal to a threshold.

The SPI throttle is active if the SPI throttle is enabled, the third trigger is set, and either the first trigger or the second trigger is set. The throttling logic and the SPI uses register fields that control the number of dead cycles indicated by the stall counter. A first field indicates a number of dead cycles added on a transition from a "no throttle" condition to a throttling condition. The second field indicates an increment or decrement to the dead cycles on each sample. If throttling is enabled and the next geometry shader wave has been granted resources, the stall counter is loaded with the stall count and starts to down count. The number of dead cycles to be added is determined on sample but the count is used in response to the next geometry shader wave being granted resources.

Figure 8:
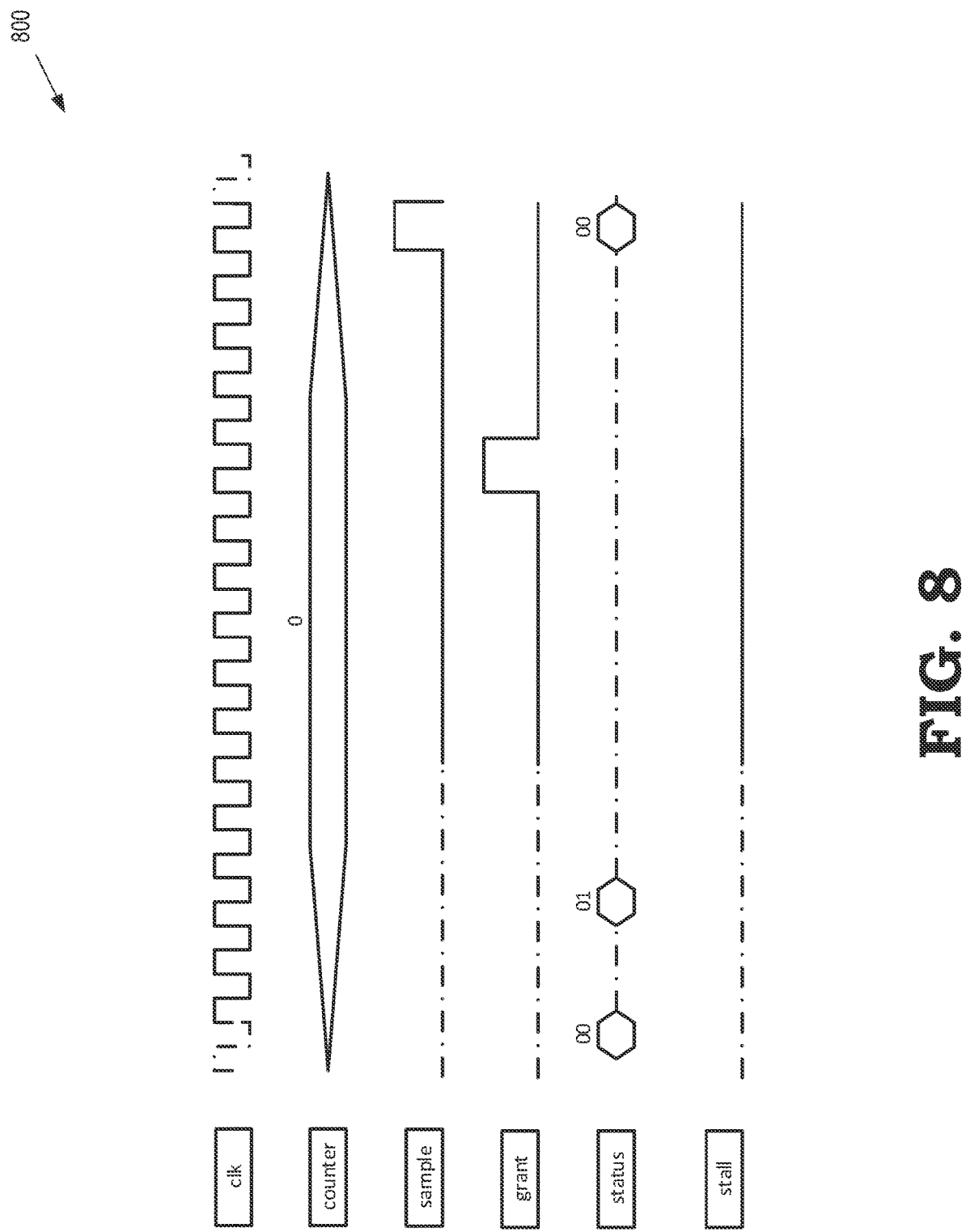
FIG. 8 illustrates a first time interval that represents a "no throttle" state prior to throttling geometry shader waves according to some embodiments. In the illustrated embodiment, sampling logic begins to sample.

FIG. 8 illustrates a first time interval 800 that represents a "no throttle" state prior to throttling geometry shader waves according to some embodiments. In the illustrated embodiment, sampling logic begins to sample. After 100 clock cycles, the sampling logic detects a signal indicating that the status of the FIFO buffer is in a primitive of is 00. No throttle is applied.

Figure 9:
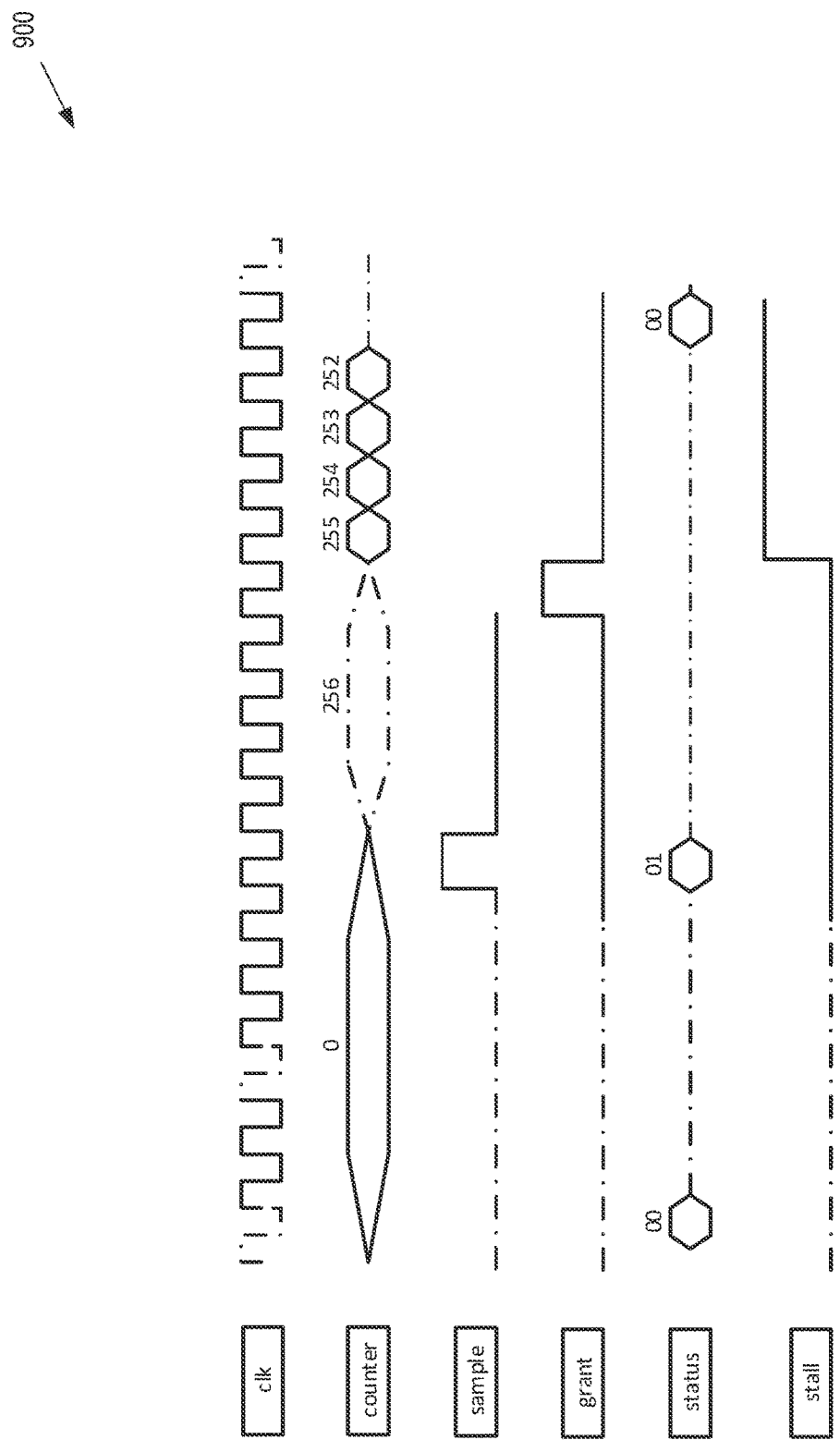
FIG. 9 illustrates a second time interval including a no-throttle to throttle transition for the geometry shader waves according to some embodiments.

FIG. 9 illustrates a second time interval 900 including a no-throttle to throttle transition for the geometry shader waves according to some embodiments. After 1000 clocks the status of the FIFO buffer in the primitive hub changes from 00 to 10. A maximum counter value is set to 256, which is equal to the throttle base*4. The next geometry shader wave is granted resources after 1200 clocks. This is the first transition from the no-throttle to throttle condition. The counter begins the down count and sets the stall until the counter goes to the predetermined value of zero.

Figure 10:
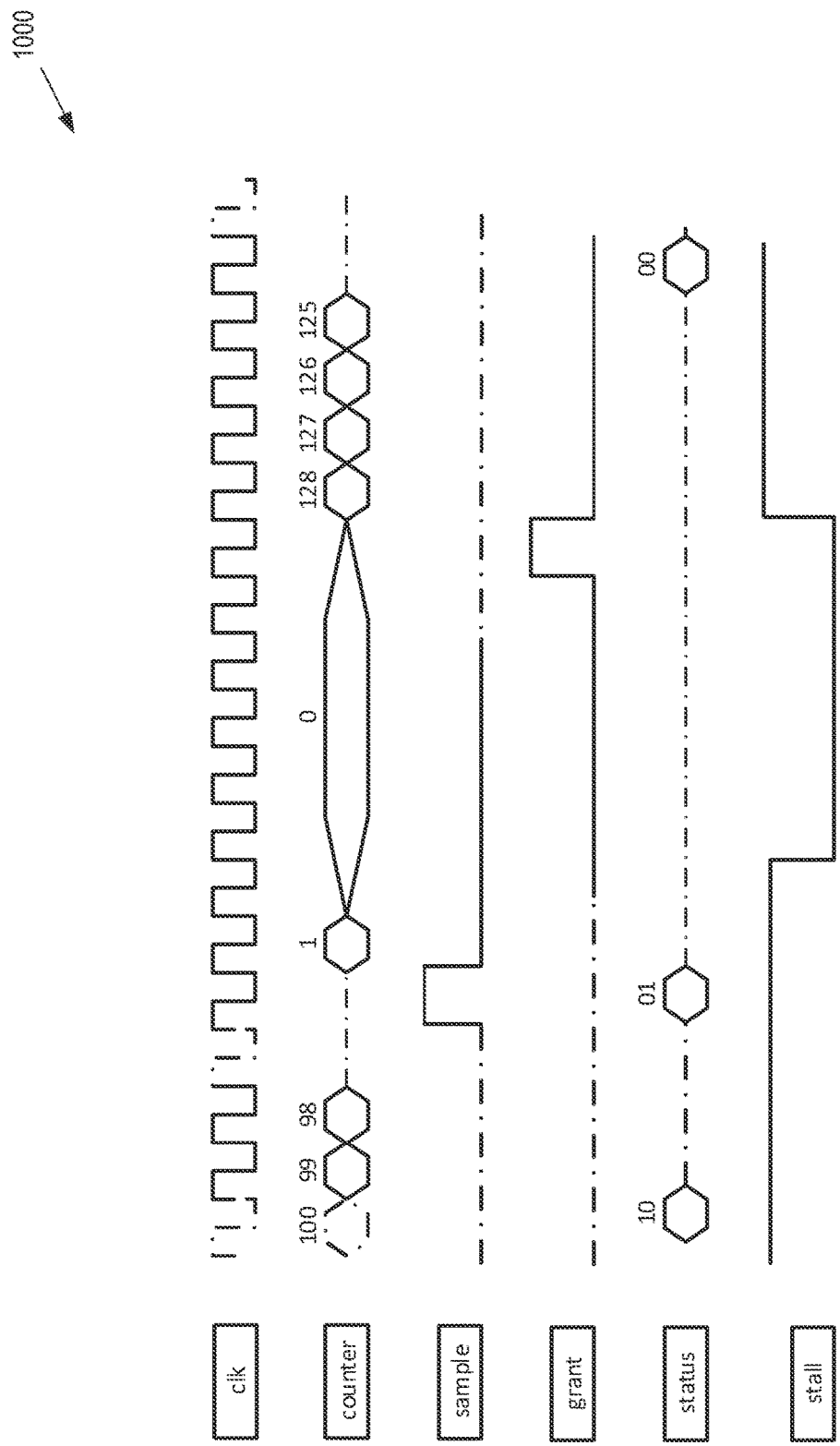
FIG. 10 illustrates a third time interval including a throttle to no-throttle transition due to a reduction in backpressure from the primitive hub according to some embodiments.

FIG. 10 illustrates a third time interval 1000 including a throttle to no-throttle transition due to a reduction in backpressure from the primitive hub according to some embodiments. At 3000 clocks, a sample detects a change in the status of the FIFO buffer in the primitive hub from 10 to 01. The maximum counter value is set to 128. The next geometry shader wave is granted at 3100 clocks. The counter begins to count and the stall stays high for 128 clocks.

Figure 11:
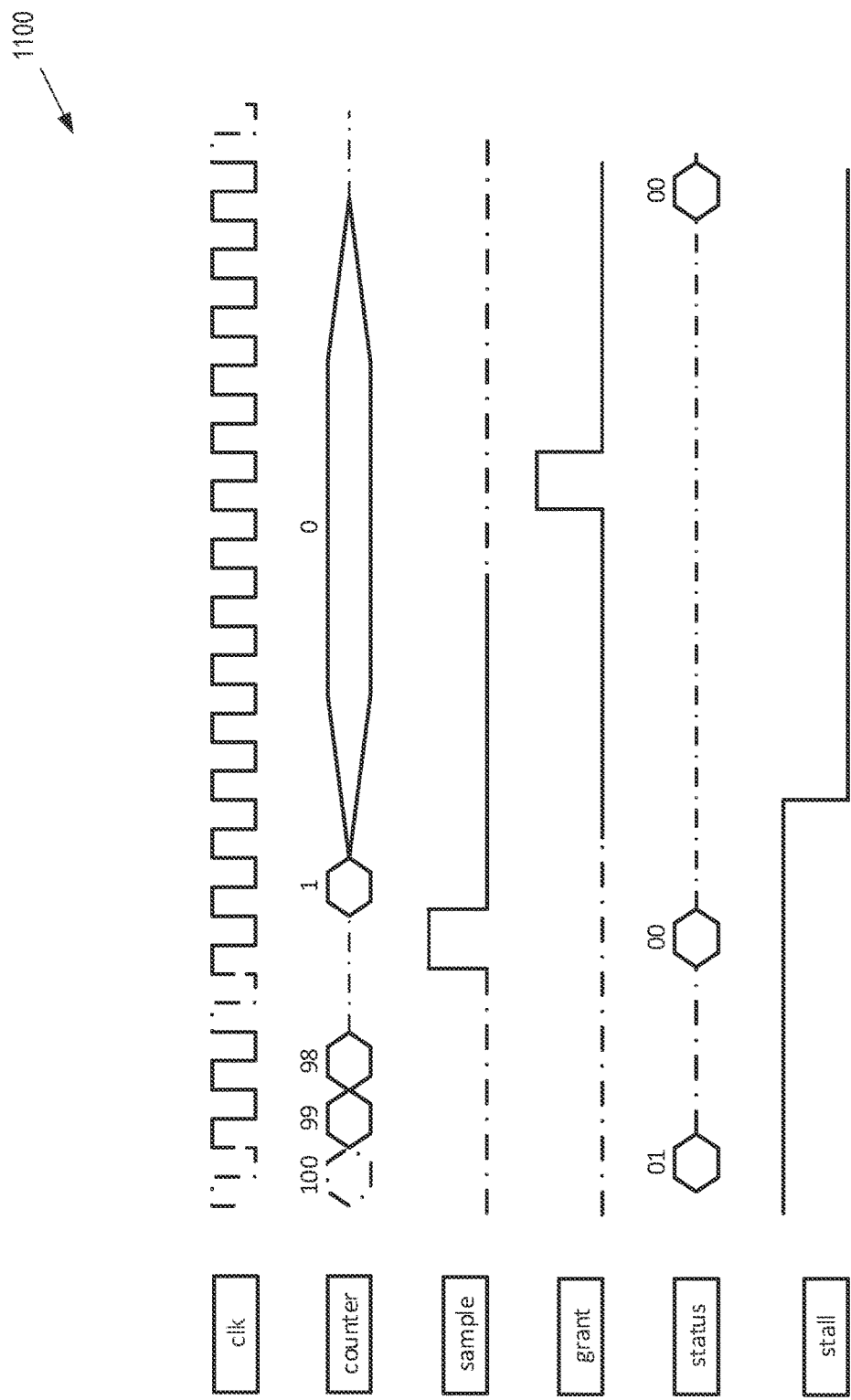
FIG. 11 illustrates a fourth time interval in which the transition from throttling to no-throttle is completed according to some embodiments.

FIG. 11 illustrates a fourth time interval 1100 in which the transition from throttling to no-throttle is completed according to some embodiments. At 3500 clocks, the sampling detects a change in the status of the FIFO buffer is in the primitive hub from 01 to 00. The maximum counter value is set to zero. At 3600 clocks the sampling detects no change in the status of the FIFO buffers in the primitive hub. The maximum counter value remains at zero.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a graphics pipeline configured to execute a first shader of a first type and a second shader of a second type different from the first type;
    at least one buffer configured to hold primitives generated by the first shader and provide the primitives to the second shader; and
    a primitive hub configured to monitor at least one fullness of the at least one buffer, wherein launching of waves from the first shader is throttled based on a relative allocation of resources between the first shader and the second shader, the relative allocation based on the at least one fullness and based on a number of dead cycles associated with the primitives generated by the first shader and provided to the second shader.

2. The apparatus of claim 1, wherein the first shader is a geometry shader, wherein the second shader is a pixel shader, and wherein the at least one buffer is a first-in-first-out (FIFO) buffer.

3. The apparatus of claim 2, further comprising:
    a counter configured to indicate the number of dead cycles; and
    a shader processor input (SPI) configured to selectively throttle waves launched by the geometry shader based on the counter.

4. The apparatus of claim 3, wherein the primitive hub is configured to provide a feedback signal indicating the at least one fullness to the SPI, and wherein a first number of dead cycles is determined based on the feedback signal.

5. The apparatus of claim 4, wherein the SPI is configured to determine at least one of a first relative allocation of local data store (LDS) resources to in-flight geometry shader waves and in-flight pixel shader waves and a second relative allocation of vector general-purpose registers (VGPRs) to the in-flight geometry shader waves and the in-flight pixel shader waves.

6. The apparatus of claim 5, wherein the SPI is configured to determine a second number of dead cycles by comparing the first relative allocation to a first threshold, comparing the second relative allocation to a second threshold, or a combination thereof.

7. The apparatus of claim 6, wherein the SPI is configured to determine at least one lifetime of at least one wave launched by the geometry shader and determine a third number of dead cycles based by comparing the at least one lifetime to at least one third threshold.

8. The apparatus of claim 7, wherein the counter is incremented based on at least one of the first number, the second number, and the third number of dead cycles, and wherein the counter is decremented at each clock cycle.

9. The apparatus of claim 8, wherein the geometry shader launches waves in response to the counter having a predetermined value.

10. A method comprising:
    executing a first shader of a first type and a second shader of a second type, the second type different from the first type, on a graphics pipeline;
    monitoring, at a primitive hub in the graphics pipeline, at least one fullness of at least one buffer configured to hold primitives generated by the first shader and provide the primitives to the second shader; and
    selectively throttling waves launched from the first shader based on a relative allocation of resources between the first shader and the second shader, the relative allocation based on the at least one fullness and based on a number of dead cycles associated with the primitives generated by the first shader and provided to the second shader.

11. The method of claim 10, wherein the first shader is a geometry shader, wherein the second shader is a pixel shader, and wherein the at least one buffer is a first-in-first-out (FIFO) buffer.

12. The method of claim 11, further comprising:
    modifying a counter to indicate the number of dead cycles; and
    selectively throttling, at a shader processor input (SPI), the waves launched by the geometry shader based on the counter.

13. The method of claim 12, further comprising:
    providing a feedback signal from the primitive hub to the SPI to indicate the at least one fullness; and
    determining a first number of dead cycles based on the feedback signal.

14. The method of claim 13, further comprising:
    determining, at the SPI, at least one of a first relative allocation of local data store (LDS) resources to in-flight geometry shader waves and in-flight pixel shader waves and a second relative allocation of vector general-purpose registers (VGPRs) to the in-flight geometry shader waves and the in-flight pixel shader waves.

15. The method of claim 14, further comprising:
    determining, at the SPI, a second number of dead cycles by comparing the first relative allocation to a first threshold, comparing the second relative allocation to a second threshold, or a combination thereof.

16. The method of claim 15, further comprising:
    determining, at the SPI, at least one lifetime of at least one wave launched by the geometry shader; and
    determining, at the SPI, a third number of dead cycles based by comparing the at least one lifetime to at least one third threshold.

17. The method of claim 16, further comprising:
    incrementing the counter based on at least one of the first number, the second number, and the third number of dead cycles, and wherein the counter is decremented at each clock cycle.

18. The method of claim 17, wherein selectively throttling the waves launched by the geometry shader comprises launching waves from the geometry shader in response to the counter having a predetermined value.

19. An apparatus comprising:
    a primitive hub configured to monitor at least one fullness of at least one buffer configured to hold primitives generated by a geometry shader and provide the primitives to a pixel shader in a graphics pipeline; and
    a shader processor input (SPI) configured to selectively throttle waves launched by the geometry shader based on a relative allocation of resources between the geometry shader and the pixel shader, the relative allocation based on a number of dead cycles associated with the primitives generated by the geometry shader and provided to the pixel shader and at least one of a signal from the primitive hub indicating the at least one fullness, an indication of relative resource usage of geometry waves and pixel waves in the graphics pipeline, and an indication of lifetimes of the geometry waves.

20. The apparatus of claim 19, wherein the signal from the primitive hub comprises two bits having values mapped to different ranges of the at least one fullness.

* * * * *